Patented July 4, 1933

1,916,902

UNITED STATES PATENT OFFICE

RALPH C. WILBUR, OF BROOKLYN, NEW YORK, ASSIGNOR TO GENERAL CHEMICAL COMPANY, OF NEW YORK N. Y., A CORPORATION OF NEW YORK

ADSORBENT

No Drawing. Application filed November 19, 1930. Serial No. 496,833.

This invention relates to an activated silicate, and to a method of producing the same. The invention is particularly directed to a process for preparing from clays and silicious materials an activated silicious substance for use in purifying, filtering, bleaching and decolorizing oils, other solutions and gases.

Several processes for making active silicas and silicates and various decolorizing and purifying agents have been proposed. Such substances previously employed in the arts may generally be considered as falling within one of two broad classes. The first of these includes earths which are found in their natural state in such condition as to be substantially ready for use. Fuller's earth and bauxite are two well known examples of this type of material. A second generic class, which may be regarded broadly as directed to artificial substances, includes acid treated clays, and gels of various kinds generated, as a rule, by processes involving reactions between the soluble silicates and acids. Of the acid treated clays well known substances resulting from acid treatment of bentonite and montmorillonite are representative, and gels, such as silica gel, are examples of the second type. There is a wide difference between the substances of each broad class both with respect to initial cost of manufacture and their efficiency as decolorizing and purifying agents.

The present invention is directed to a process for making an activated silicious substance having a greater efficiency than known purifying and decolorizing agents of either the first or second classes, but yet of such nature that the initial cost of manufacture is greatly reduced.

It is one of the principal objects of the invention to produce an activiated silicious substance from clays and silicious materials which has a marked efficiency as compared with adsorbent materials of somewhat similar physical and chemical characteristics produced from clays and related silicious raw materials. A further object of the invention lies in the provision of a process by which, on account of the nature of the raw materials which may be employed, the cost of production of the improved activated silicate is reduced to a minimum. The invention additionally contemplates the provision of a process in certain phases of which the reagents utilized may be economically regenerated in substantially quantitative amounts.

A further important object of the invention is directed to the provision of a process by which the field of raw materials serving as a source of silica in the finished product is greatly extended. The invention contemplates broadly the utilization of clays and silicious materials of different character than heretofore employed, and in other words, looks to the use of clays and silicates having little or no original adsorbent or purifying properties in untreated condition as a source of material for the improved product. Beyond this, it is a further object of the invention to provide a process by which a superior product can be made from silicious materials constituting the tailings or waste of chemical processes involving the treatment of clays and related silicates and other mineral substances containing substantial amounts of silica, in which processes the silica content may be partially or wholly the unsought for constituent. Accordingly, the invention generally is directed to the production of an activated silicate or activated silicious substance from sources of raw materials not heretofore employed for the purpose, or from the silicious waste of various chemical processes, and to a method of making the improved product by a process, in certain phases of which the reagents utilized may be regenerated.

Where the material employed as a source of silicate is in the raw condition, i. e. substantially in the original form as mined as a metal silicate, it may be for example intially dried, crushed and calcined. Following calcination, the silicious material may be digested in a strong mineral acid, and the acid soluble constituents separated from the silicous residue by washing. The silicious residue thus obtained is digested, with the aid of heat, in an alkaline solution. During the digestion, components largely of a silicious nature are dissolved out of the silicious residue and pass into the alkaline solution. The solid undissolved material of reduced silicious content remaining in the solution is separated therefrom, and subjected to a second acid digestion. The solid residue remaining after the acid digestion is separated from the acid solution and included acid-soluble substances, and after washing, drying and grinding, constitutes the product of the invention. In other instances where the silicious material utilized as a source of silicate is the by-product of a chemical process involving an acid treatment of a silicate and in which acid-soluble substances have been separated and removed from the silicious residue, or where the silicious material is a substance which in its natural or raw state has physical structure and characteristics similar to acid treated silicate, the silicious material is subjected to successive digestions in alkaline and acid solutions, and the undissolved material remaining after washing, drying and grinding comprises the improved product. In still other instances where the silicious material employed is a silicious residue of chemical processes including successive acid and alkaline digestions, such residue is subjected directly to a final acid digestion in an acid solution, and the ultimate product is obtained by washing, drying and grinding the undissolved residual material.

One mode of carrying out the invention employing specific raw materials and operating conditions is as follows. In this example, the raw material was a flint clay, substantially kaolinite, and of approximately the following composition:

Alumina ($Al_2O_3$)_____ 40%
Silica ($SiO_2$)_____ 45%
Water ($H_2O$)_____ 13%
Titania, iron oxides, alkalies, etc___Balance The clay was dried, crushed to a suitable degree of fineness, and then calcined at a temperature of approximately 650° C. Following calcination, the clay was cooled and ground. The finely ground calcined clay was then digested with 40% sulfuric acid for a period sufficient to facilitate the dissolution by the acid of substantially all the readily acid soluble substances. In the particular instance, a large proportion of alumina was liberated, taking the form of aluminum sulfate. The aluminum sulfate and other acid soluble substances were then removed from the acid-treated clay by washing with water. After washing and drying, the silicious clay residue remaining analyzed substantially as follows:

Silica ($SiO_2$)_____ 70%
Alumina ($Al_2O_3$)_____ 14%
Titania, iron oxides ignition loss, etc_____Balance The clay residue was ground to such an extent that substantially all of the material passed a 300 mesh screen. A mixture comprising one part of ground clay residue to four parts of sodium carbonate in the form of a 20% solution, i. e., 4 parts of sodium carbonate to 16 parts of water, was boiled for about one hour. During the digestion, a substantial quantity of silica and smaller quantities of other substances were dissolved out of the clay residue and passed into the alkaline solution.

On completion of the boiling, the digested mass was filtered while the solution was still hot and at an elevated temperature not substantially less than that of the digestion. During digestion, the original clay residue was reduced approximately 50% by weight. The filtered and substantially dried residue undissolved by digestion in the alkaline solution analyzed substantially as follows:

Silica ($SiO_2$)_____ 56%
Alumina ($Al_2O_3$)_____ 25%
Iron oxides, titania, lime, water, etc___Balance The clear filtrate remaining after digestion and separation of the undissolved silicious residue from the alkaline solution while in the hot state apparently contained sodium silicate ($Na_2SiO_3$), sodium bicarbonate ($NaHCO_3$), and sodium carbonate ($Na_2CO_3$). By means of a process, not my invention, the clear filtrate may be cooled in such manner as to precipitate therefrom an active silica having purifying and decolorizing properties which are particularly adapted for the treatment of certain kinds of oils.

In accordance with the invention it has been found that undissolved silicious residue of the foregoing successive acid and alkaline digestions is, when subjected to further treatment, an activated silicate or activated silicious substance having valuable purifying and decolorizing properties which render the product adaptable for the treatment and purification of certain types of oils.

One part of the undissolved silicious residue filtered free from the alkaline solution and the included dissolved substances was digested with ten parts of 20% sulfuric acid. During this digestion, a large proportion of the alumina and iron contained in the silicious material was removed therefrom and passed into the solution. Following the acid digestion which is continued for about an hour at approximately the boiling temperature, the remaining solid silicious material was separated from the acid solution, and the acid soluble substances by filtration. The silicious material thus obtained was purified by washing, and after drying and subsequent grinding, constituted the activated silicate product of the process. Such product analyzed substantially as follows:

Silica_____ 61%
Alumina_____ 19%
Iron oxide, magnesia, lime, loss on ignition etc._____Balance and was a pinkish brown and relatively dense powder.

In the initial and final acid digestion stages, any acid such as sulfuric, hydrochloric, or nitric acids may be employed. The strength of the acid solutions, and the period of digestion as well as the temperatures may also be suitably varied. Pressure may also be employed to aid in the acid digestion stages. The concentration of the sodium carbonate solution may also be varied over a considerable range. It appears that the dissolution of certain alkali soluble silicious components is more complete in a relatively concentrated solution, although such concentration may vary from less than 10 to about 24%. A potassium carbonate solution or a solution comprising a mixture of sodium and potassium carbonates of suitable concentration may be employed. In cases where it is not desired to treat the filtrate of the alkaline digestion by cooling to precipitate therefrom an active silica as above noted, satisfactory results may also be obtained where solutions of sodium and/or potassium hydroxides are utilized.

A satisfactory product may be obtained where the undissolved residue resulting from the alkaline digestion is separated from the solution after the latter has been cooled to a temperature materially below that of the digestion. However, it is preferred to effect separation of the alkaline solutions and the undissolved residue while the solution is hot, and at a temperature not substantially less than that of the digestion.

As noted above, the filtrate obtained on separation of the undissolved silicious residue by the digestion with the alkali carbonate is a clear solution, and apparently contains principally while hot, sodium silicate, sodium carbonate and sodium bicarbonate. During the hot digestion of the silicious material in the sodium carbonate solution, sodium bicarbonate is formed which, in the process of boiling, incurs a consequent loss of some carbon dioxide. In practice, the carbonate digestion may be carried out under such conditions that the carbon dioxide evolved is drawn off and conserved. When such carbon dioxide, or an equivalent quantity in the form of sodium bicarbonate, is turned back into the filtrate, the latter is substantially all transformed back to sodium carbonate and may be returned to the process and utilized in a subsequent carbonate digestion, thus increasing the economies of the process as a whole.

In the specific example given above, it will be observed that the raw material employed was a clay having the characteristics and approximate composition of kaolinite. The process is particularly adaptable to make use of many different clay materials of this general type including material which in either the raw state or after an initial acid treatment may have little or no purifying and decolorizing properties, and mineral substances which primarily or when subjected to an acid treatment have some more or less valuable properties as adsorbents and purifying agents.

It will be seen from the above that the invention generally speaking comprises an alkaline digestion of silicious material followed by an acid digestion of the silicious material remaining after the alkaline digestion, the final undissolved silicious residue of the acid digestion constituting the product of the process. The invention contemplates the utilization, broadly, of two classes of materials for treatment in accordance with the present invention, namely, the silicious by-products of chemical processes involving preferably the acid treatment of silicious materials, and other silicious materials, which, in either a natural or altered condition, have physical structure and other characteristics similar to acid treated silicates. It is therefore apparent from the foregoing description that when the material employed in the present process is the by-product of an acid treatment, or is a natural substance having similar characteristics, the alkaline and subsequent acid digestions are employed. Where the material used is the silicious by-product of prior successive acid and alkaline treatments, such, for example as set forth in the aforementioned application, the silicious material may be subjected directly to the final acid digestion, and the product of the invention obtained therefrom. In other instances, where the raw material does not have a particle size or physical structure or characteristics similar to acid treated silicates, such raw material is preferably subjected to an acid treatment prior to the alkaline digestion.

I claim

1. The method of preparing an activated silicious susbtance which comprises digesting silicious material in a hot alkali carbonate solution, separating undissolved silicious material from the solution while maintaining the solution at an elevated temperature, digesting the undissolved silicious material in a sulfuric acid solution, separating the silicious residue from the solution, and washing and drying the silicious residue.

2. The method of preparing an activated silicious substance which comprises digesting acid treated silicious material in an alkaline solution, separating undissolved silicious residue from the solution, and treating the undissolved silicious residue with an acid.

3. The method of preparing an activated silicious substance which comprises digesting acid treated silicious material in an alkaline solution, separating undissolved silicious material from the solution, treating the undissolved silicious material with an acid, and separating acid soluble substances therefrom.

4. The method of preparing an activated silicious substance which comprises digesting acid treated silicious material in an alkaline solution, separating undissolved silicious material from the solution, digesting the undissolved silicious material in a hot acid solution, and separating acid soluble substances therefrom.

5. The method of preparing an activated silicious substance which comprises digesting silicious material in an acid solution, separating acid soluble substances therefrom, digesting the silicious residue in an alkaline solution, separating undissolved silicious material from the solution, and treating the undissolved silicious material with an acid.

6. The method of preparing an activated silicious substance which comprises digesting silicious material in an acid solution, separating acid soluble substances therefrom, digesting the silicious residue in an alkaline solution, separating undissolved silicious material from the solution, treating the undissolved silicious material with an acid, and separating acid soluble substances therefrom.

7. The method of preparing an activated silicious substance which comprises digesting clay in an acid solution, separating the silicious residue from the solution, digesting the silicious residue in a hot alkali carbonate solution, separating undissolved silicious material from the solution, digesting the undissolved silicious material in a sulfuric acid solution, separating acid soluble substances from the silicious residue and washing and drying the silicious residue.

8. The method of preparing an activated silicious substance which comprises digesting clay in an acid solution, separating the undissolved silicious residue from the solution, digesting the silicious residue in a hot alkali carbonate solution, separating undissolved silicious material from the solution while maintaining the same at an elevated temperature, digesting the undissolved silicious material in a hot sulfuric acid solution, separating acid soluble substances from the silicious residue, and washing and drying the silicious residue.

9. The method of preparing an activated silicious materal which comprises digesting silicious material in an alkaline solution, separating undissolved silicious material from the solution, treating the undissolved silicious material for a substantial period of time with a relatively concentrated acid, whereby the silicious material is converted to an active form, and separating acid-soluble substances from the silicious material.

10. The method of preparing an activated silicious material which comprises digesting silicious material in an alkaline solution, separating undissolved silicious material from the solution, and then treating the undissolved silicious material with a relatively concentrated acid solution whereby the silicious material is converted to an active form.

11. The method of preparing an activated silicious material which comprises digesting silicious material in a hot alkaline solution, separating undissolved silicious material from the solution, digesting the undissolved silicious material for a substantial period of time in a relatively concentrated acid solution, separating acid-soluble substances from the silicious residue, and washing and drying the silicious residue.

12. The method of preparing an activated silicious substance which comprises digesting an alkali treated silicious material for a substantial period of time in a relatively concentrated acid solution, and separating the silicious residue from the solution.

13. The method of preparing an activated silicious substance which comprises digesting at elevated temperatures an alkali carbonate treated silicious material for a substantial period of time in a relatively concentrated sulfuric acid solution, separating undissolved silicious residue from the solution, and washing and drying the silicious residue.

14. The method of preparing an activated silicious substance which comprises digesting acid-treated silicious material in a hot alkaline solution, separating undissolved silicious material from the solution, and treating the undissolved silicious material for a substantial period of time with a relatively concentrated acid solution.

15. The method of preparing an activated silicious substance which comprises digesting acid treated silicious material in a hot alkaline solution, separating undissolved silicious material from the solution, digesting the undissolved silicious material for a substantial period of time in a relatively concentrated acid solution, separating acid-soluble substances from the silicious residue, and washing and drying the silicious residue.

16. The method of preparing an activated silicious substance which comprises digesting silicious material in an acid solution, separating acid-soluble substances therefrom, digesting the silicious residue in a hot alkaline solution, separating undissolved silicious material from the solution, digesting the undissolved silicious material for a substantial period of time in a relatively concentrated acid solution, and separating acid-soluble substances therefrom.

In witness whereof, I have hereunto set my hand.

RALPH C. WILBUR.